(12) United States Patent  
Chamberlin et al.

(10) Patent No.: US 7,475,893 B2
(45) Date of Patent: Jan. 13, 2009

(54) SUSPENSION ADAPTOR

(75) Inventors: Michael Chamberlin, Richland, MI (US); Kevin M. Ledford, Kalamazoo, MI (US); Andrew Power, Kalamazoo, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 381 days.

(21) Appl. No.: 11/365,304

(22) Filed: Feb. 28, 2006

(65) Prior Publication Data

US 2007/0200312 A1 Aug. 30, 2007

(51) Int. Cl.
*B60G 9/00* (2006.01)

(52) U.S. Cl. .............................................. 280/124.116

(58) Field of Classification Search .......... 280/124.116, 280/124.157; 267/35, 66, 122, 153, 292, 267/64.21, 64.23, 64.24, 64.27, 64.11, 64.19
See application file for complete search history.

(56) References Cited

U.S. PATENT DOCUMENTS

| 5,560,641 | A | 10/1996 | Vogler |
| 5,954,351 | A | 9/1999 | Koschinat |
| 6,250,613 | B1 | 6/2001 | Koeske et al. |
| 6,460,872 | B2 | 10/2002 | Cadden |
| 6,752,407 | B2 | 6/2004 | Warinner |
| 6,945,548 | B2 | 9/2005 | Dudding et al. |
| 7,328,887 | B2 * | 2/2008 | Leonard ...................... 267/122 |

* cited by examiner

*Primary Examiner*—John Q. Nguyen
*Assistant Examiner*—Robert A. Coker
(74) *Attorney, Agent, or Firm*—Marshall & Melhorn, LLC

(57) ABSTRACT

A vehicle suspension having a trailing arm, an air spring assembly and a spacer. The spacer is removably located between the trailing arm and the air spring assembly. Either or both of the top surface or the bottom surface of the spacer are tapered.

22 Claims, 10 Drawing Sheets

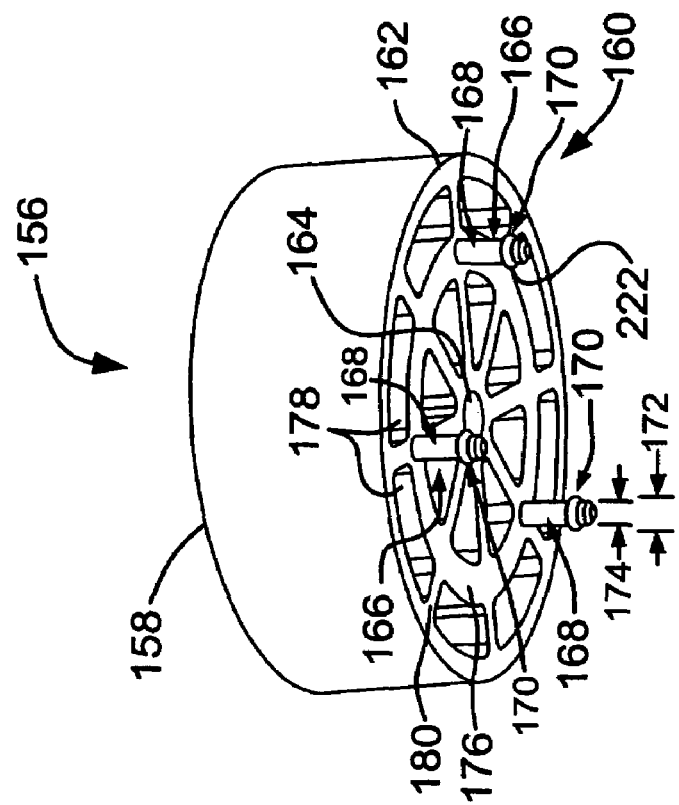
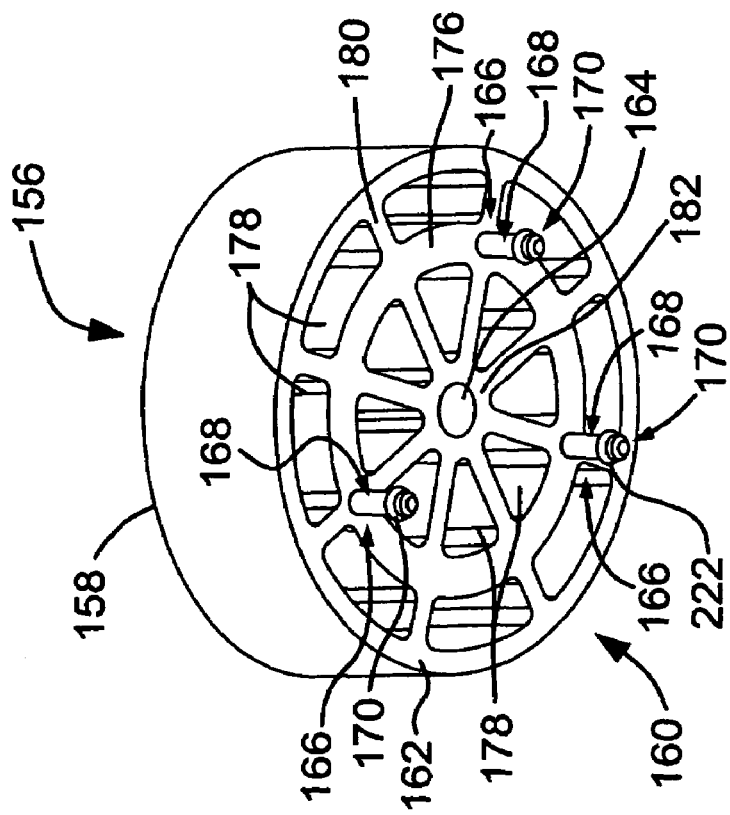

SUSPENSION ADAPTOR

FIELD OF THE INVENTION

The present invention relates to a suspension adaptor for a vehicle. More particularly, the present invention relates to a suspension adaptor located between a trailing arm and an air spring assembly of a vehicle.

BACKGROUND OF THE INVENTION

It is well-known in the art to include various structures between components of a vehicle suspension to properly align the components and provide the proper ride height for the vehicle. For example, an upwardly extending weldment is typically located on an upper, rear portion of each trailing arm of the vehicle. The weldment provides a seat above the upper rear portion of the trailing arm on which an air spring assembly rests. Additionally, a spacer may be located between the weldment and the air spring. The spacer and weldment combination provides the proper ride height for the vehicle.

The weldment, however, suffers from several disadvantages. First, it adds weight to the suspension. Second, since it must be attached by welding, it adds to the cost of the suspension in terms of labor and materials. Third, it limits the ride height options that are available for a given suspension. For example, if the vehicle owner wants to change the ride height of the vehicle, the weldment must be ripped out and an entirely new weldment, designed to provide the desired ride height, must be installed.

It would therefore be advantageous to have a structure that was lightweight, inexpensive to manufacture, inexpensive and easy to install and which made modifying the ride height of a vehicle easy.

SUMMARY OF THE INVENTION

The present invention is directed toward a vehicle suspension comprising a trailing arm, an air spring assembly and a spacer. The trailing arm has a forward portion and a rear portion where the rear portion has an upper, planar surface. The air spring assembly has a bellows located between a base and an upper plate. The spacer has an upper surface and a lower surface where the lower surface rests on the upper planar surface of the trailing arm and the upper surface contacts the base of the air spring assembly. The spacer is tapered from the rear portion of the trailing arm toward the forward portion of the trailing arm to locate the air spring assembly at a predetermined angle.

BRIEF DESCRIPTION OF THE DRAWINGS

The above, as well as other advantages of the present invention, will become readily apparent to those skilled in the art from the following detailed description when considered in the light of the accompanying drawings in which:

FIG. 8 is a bottom, perspective view of another spacer of the present invention;

FIG. 9 is another bottom, perspective view of the spacer of FIG. 8;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
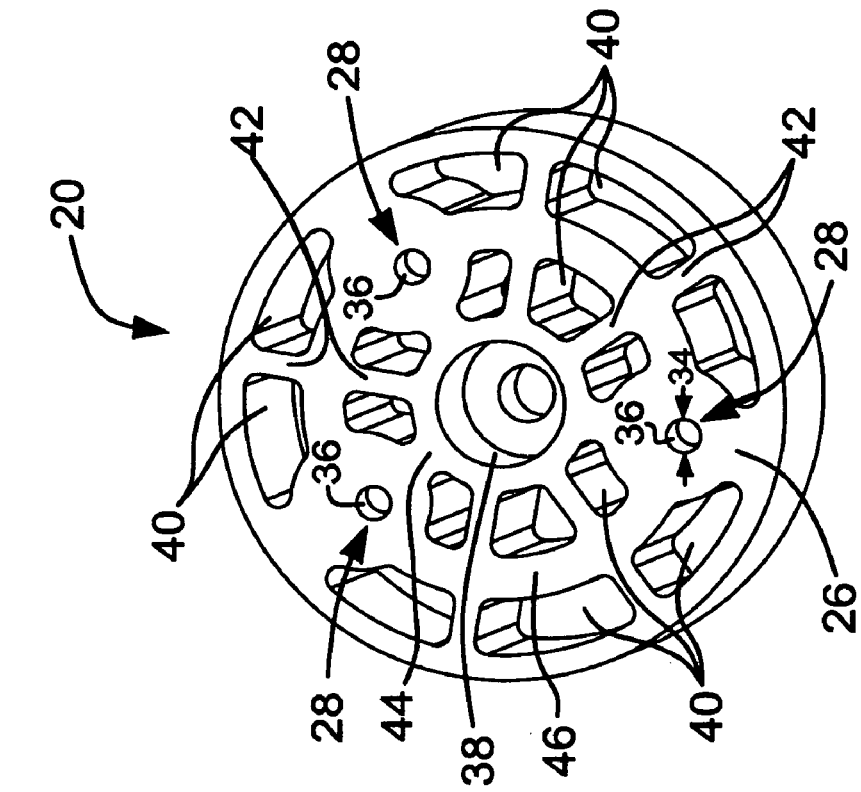
FIG. 1 is a top, perspective view of a spacer of the present invention.
Figure 2:
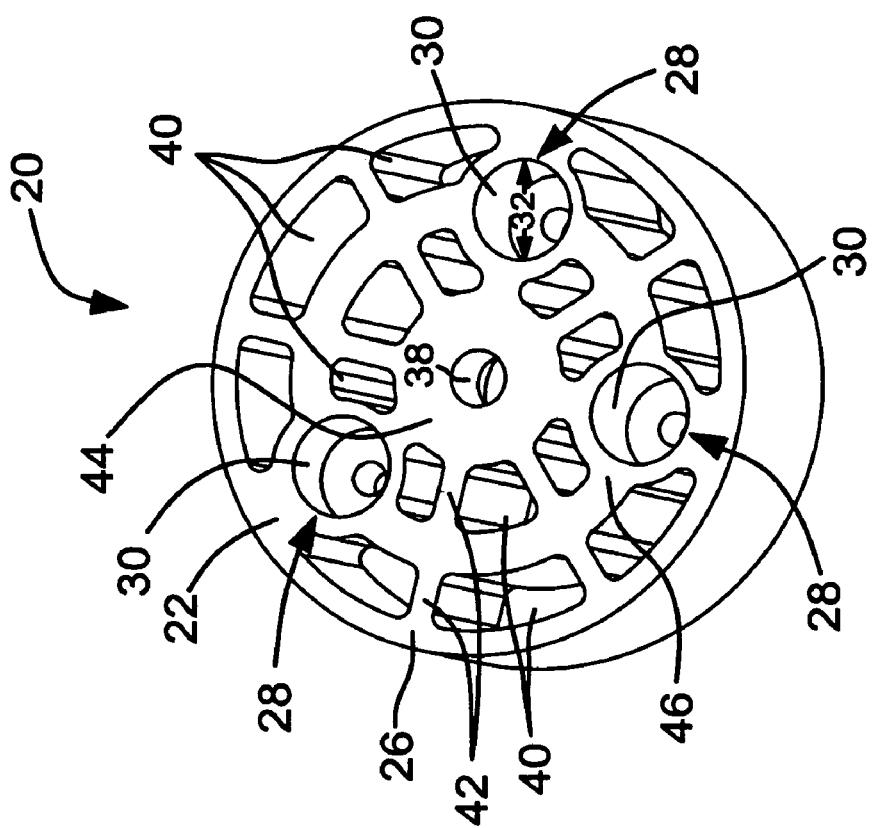
FIG. 2 is a bottom, perspective view of the spacer of FIG. 1.
Figure 3:
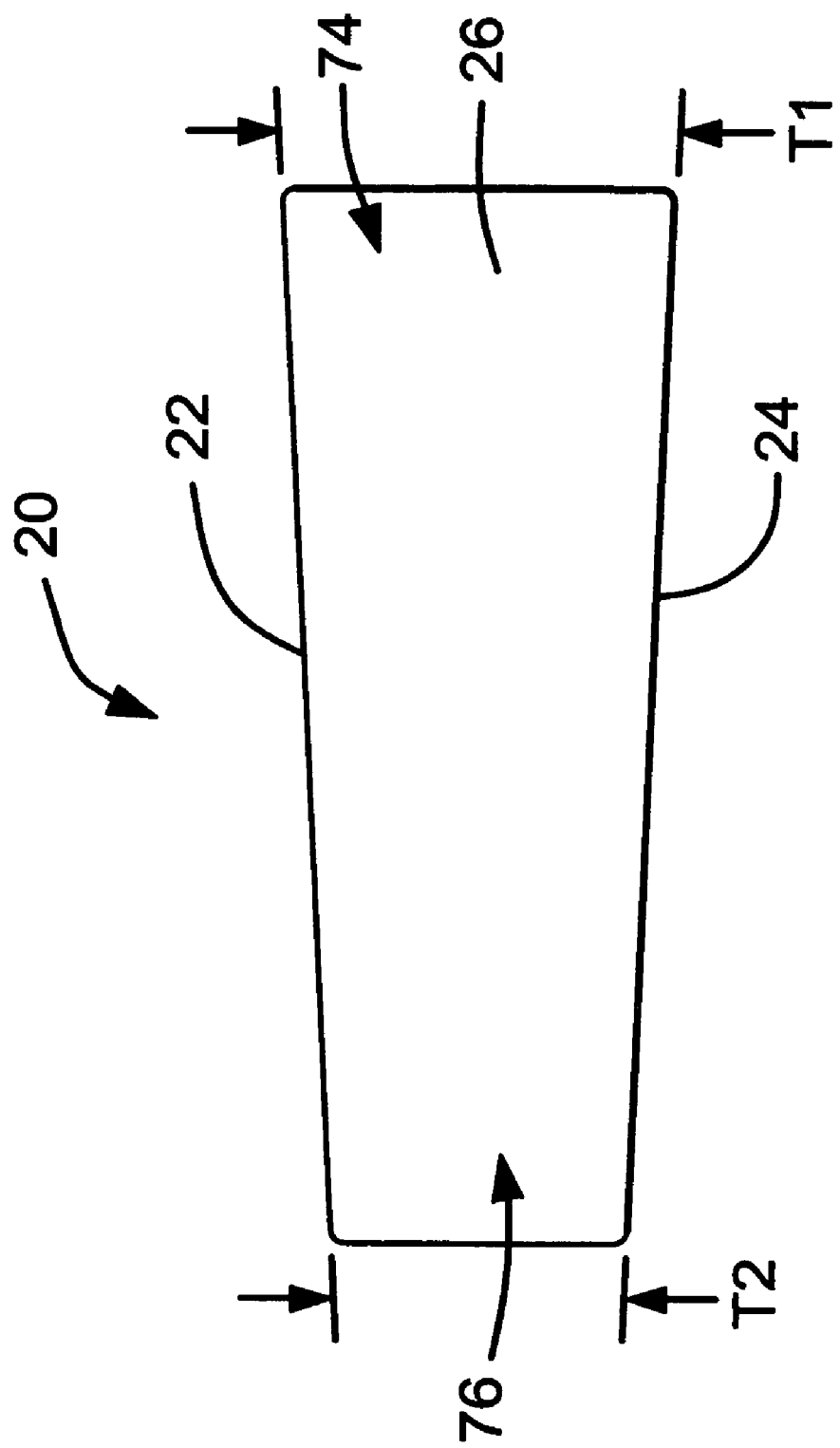
FIG. 3 depicts a side view of the spacer depicted in FIGS. 1 and 2.

Referring now to FIGS. 1, 2 and 3, one embodiment of a spacer 20 of the present invention is depicted. The spacer 20 has an upper surface 22 and a lower surface 24. The upper surface 22 and the lower surface 24 are bounded by a curvilinear outer wall 26. Preferably, the outer wall 26 is substantially cylindrical, however, the present invention is not limited to cylindrical outer walls. The present invention functions equally well with outer walls that are of any shape.

The spacer 20 may be constructed or formed of one or more materials. For example, the spacer 20 may be a polymeric material, such as a plastic-type material, and/or it may be made of a metal material, such as iron or stainless steel.

A plurality of fastener apertures 28 extend from the upper surface 22 to the lower surface 24. Each of the fastener apertures 28 has an upper portion 30 that has a larger diameter 32 than a diameter 34 of a lower portion 36. The lower portion 36 is located directly beneath the upper portion 30. The upper portion 30 permits a mechanical fastener, such as a bolt, to be recessed into the spacer 20, as described in more detail below.

The spacer 20 also has a centrally located aperture 38. The centrally located aperture 38 extends from the upper surface 22 to the lower surface 24.

The fastener apertures 28 are all preferably located substantially equidistant from the centrally located aperture 38. It is also preferred that the fastener apertures 28 are located substantially equidistant from one another except for at least one fastener aperture 28, for reasons that will be explained below.

The spacer 20 defines a second plurality of apertures 40 extending from the upper surface 22 to the lower surface 24. The second plurality of apertures 40 preferably has a constant shape and size as they extend from the upper surface 22 to the lower surface 24. The individual apertures, even though they have a constant shape and size as they extend from the upper surface 22 to the lower surface 24, need not be identical to one another. Instead, the individual apertures, as compared to one another, may have very different shapes and sizes. Preferably, the individual apertures of the second plurality of apertures 40 are located between and around the fastener apertures 28, but the present invention is not limited to this arrangement.

Preferably, the fastener apertures 28 and the second plurality of apertures 40 are arranged so as to form webs and spokes in the spacer 20. In the depicted embodiment, there is a plurality of spokes 42 and an inner web 44, a middle web 46 and an outer web. The outer web is also the outer wall 26 of the spacer 20. At least the webs 26, 44, 46 preferably align with the webs of an air spring assembly base, described in more detail below. (See, for example, FIG. 10) It is within the scope of the present invention, however, for both the webs and spokes of the spacer to align with the webs and spokes of the base or for none of the webs and/or spokes of the spacer to align with the webs and/or spokes of the base. It can be appreciated that the present invention is not limited to any particular web or spoke design.

Figure 4:
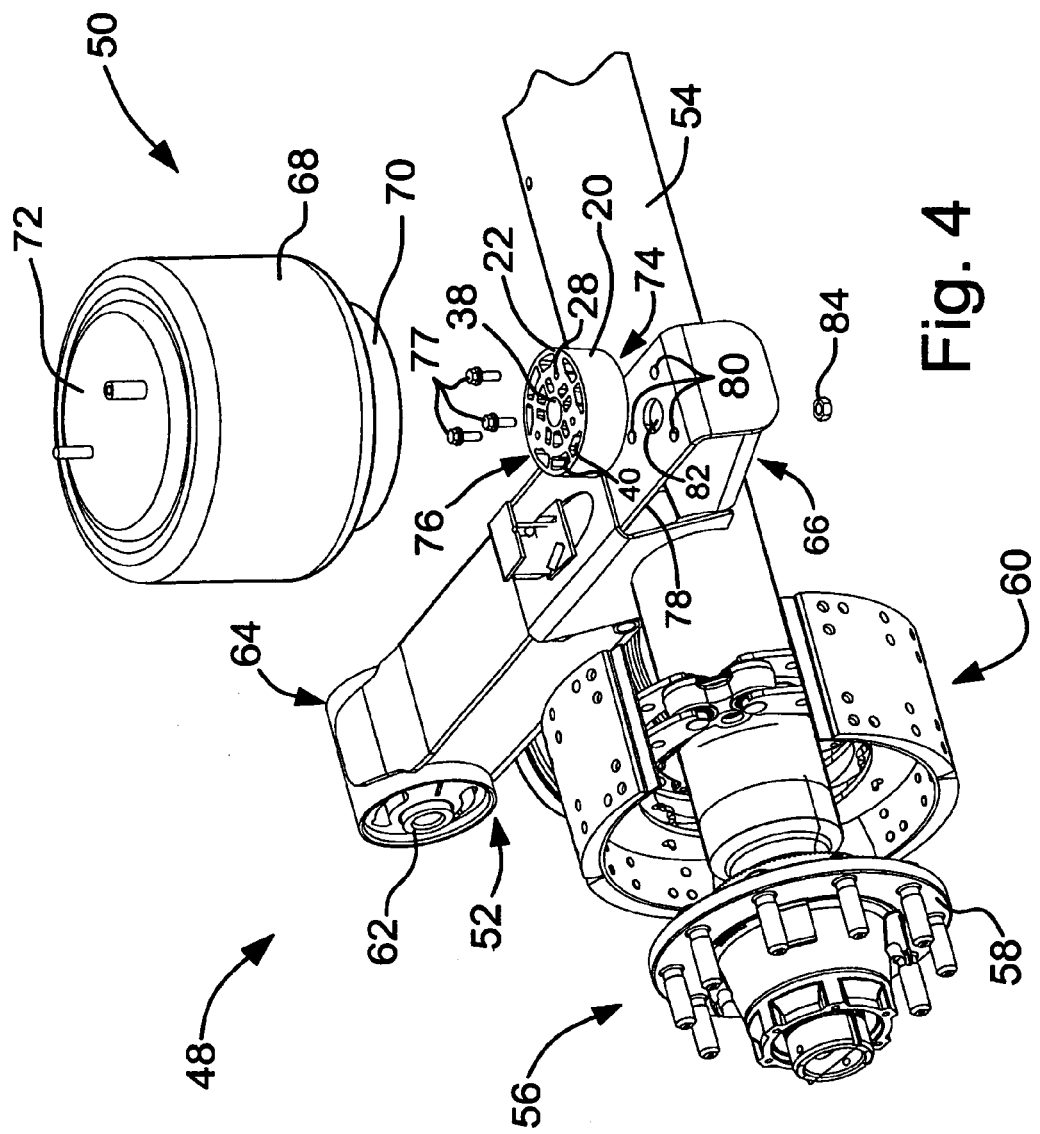
FIG. 4 depicts the spacer of FIGS. 1, 2 and 3 as well as an air spring assembly, a trailing arm and a portion of an axle.

The spacer 20 depicted in FIGS. 1, 2 and 3 is preferably installed on a vehicle suspension 48. One half of a representative vehicle suspension 48, on which the spacer 20 is installed, is depicted in FIG. 4. It can be appreciated that the other half of the vehicle suspension that is not depicted is substantially similar to the half depicted in FIG. 4.

The vehicle suspension 48 comprises an air spring assembly 50, a trailing arm 52, an axle tube 54 and a wheel end 56. The axle tube 54 supports a wheel end 56 and a wheel flange 58. A braking unit 60, such as that well known to those skilled in the art, is also depicted on the axle tube 54. It should be noted that while a trailer axle is depicted, the present invention is in no way limited to use on only trailer axles.

The trailing arm 52 is secured to the axle tube 54, such as by welding. The trailing arm 52 comprises a pivot bushing 62 at a forward portion 64 of the arm 52 for connection to a hanger bracket (not shown), as known by those skilled in the art. The trailing arm 52 also comprises a rearward portion 66.

The air spring assembly 50 comprises a bellows 68, a base 70 and an upper plate 72. The bellows 68 is located between the base 70 and the upper plate 72, as known by those skilled in the art. The base 70 preferably has a complimentary pattern of webs and spokes (not shown) to those of the spacer 20.

The spacer 20, having one tapered embodiment, is depicted in FIG. 3. Specifically, a rearward portion 74 of the spacer 20 has a thickness dimension T1 that is larger than a thickness dimension T2 of a forward portion 76 of the spacer 20. The tapered design of the spacer 20 can be accomplished by angling the upper surface 22 of the spacer 20 downwardly toward the lower surface 24, by angling the lower surface 24 of the spacer 20 upwardly toward the upper surface 22 or by angling the upper and lower surfaces 22, 24 toward each other.

Preferably, the spacer 20 is secured to the rearward portion 66 of the trailing arm 20 such that the forward portion 76 of the spacer 20 substantially faces the forward portion 64 of the trailing arm 52. This orientation of the spacer 20 causes the spacer 20 to present an upper surface 22 that is at an angle to the base 70 of the air spring assembly 50 due to the tapered nature of the spacer 20.

The spacer 20 is secured to the rearward portion 66 of the trailing arm 52 by mechanical fasteners. In the embodiment depicted in FIG. 4, self-tapping screws 77 are used to secure the spacer 20 to the trailing arm 52. One screw 77 is located through each of the fastener apertures 28 of the spacer 20. The screw 77 extends through the fastener aperture 28 and through an upper plate 78 of the rearward portion 74 of the trailing arm 52. Preferably, the head of each screw 77 is located in the increased diameter portion 32 of the fastener apertures 28 so that it is recessed within the spacer 20. Alternatively, nuts and bolts may be used to secure the spacer 20 to the trailing arm 52.

Preferably, the upper plate 78 has apertures 80 that are located in a complimentary orientation to the fastener apertures 28 of the spacer 20. Having at least one fastener aperture 28 not located an equal distance from another fastener aperture 28 forces the spacer 20 to be installed on the trailing arm 52 in a particular orientation. Specifically, the forward portion of the spacer is forced to be installed facing the forward portion 76 of the trailing arm 52 and the rearward portion 74 of the spacer 20 is forced to be installed facing the rearward portion 74 of the trailing arm 52.

A fastener (not shown) extends downwardly from the base 70 of the air spring assembly 50. This fastener extends through the centrally located aperture 38 of the spacer 20 and through an aperture 82 in the upper plate 78. A nut 84 is located on the fastener to secure the air spring assembly 50 onto the spacer 20 and the trailing arm 52. Preferably, at least the webs of the base 70 are aligned with the webs 26, 44, 46 of the spacer 20 so that compression forces from the vehicle are transmitted through the aligned webs. Again, the present invention is not limited to the webs of the base 70 and the webs 26, 44, 46 of the spacer 20 being aligned.

The tapered nature of the spacer 20 results in the air spring assembly 50 resting on the spacer 20 at a predetermined angle. This angle assists in aligning various components of the suspension. The thickness of the spacer 20 also provides the proper spacing between the trailing arm 52 and the air spring assembly 50.

The tapered nature of the spacer 20 also causes the air spring assembly 50 to be located substantially perpendicular to the main frame members (not shown) of the vehicle, despite the fact that the upper plate 78 of the trailing arm 52 is not parallel with the main frame members. Orienting the air spring assembly 50 in a substantially perpendicular orientation is preferred because when the suspension 48, including the air spring assembly 50 is fully compressed, the base 70, or a resilient component attached to the base, contacts the upper plate 72 substantially at a right angle. Those skilled in the art know that if the base 70, or its resilient member, contact the upper plate 72 at an angle substantially other than approximately 90°, a side load is generated in the upper plate 72. Side loads can result in fatigue and potential failure of the air spring assembly 50 or potentially the vehicle structural members the air spring assembly 50 is attached to.

It is a discovery of the present invention that the spacer 20, located between the trailing arm 52 and the air spring assembly 50, primarily experiences compression forces. The spacer 20 experiences little or no shear forces. Thus, robust fastening devices or welding, as known from the prior art, is not required to maintain the spacer 20 in proper position during operation of the vehicle.

Figure 6:
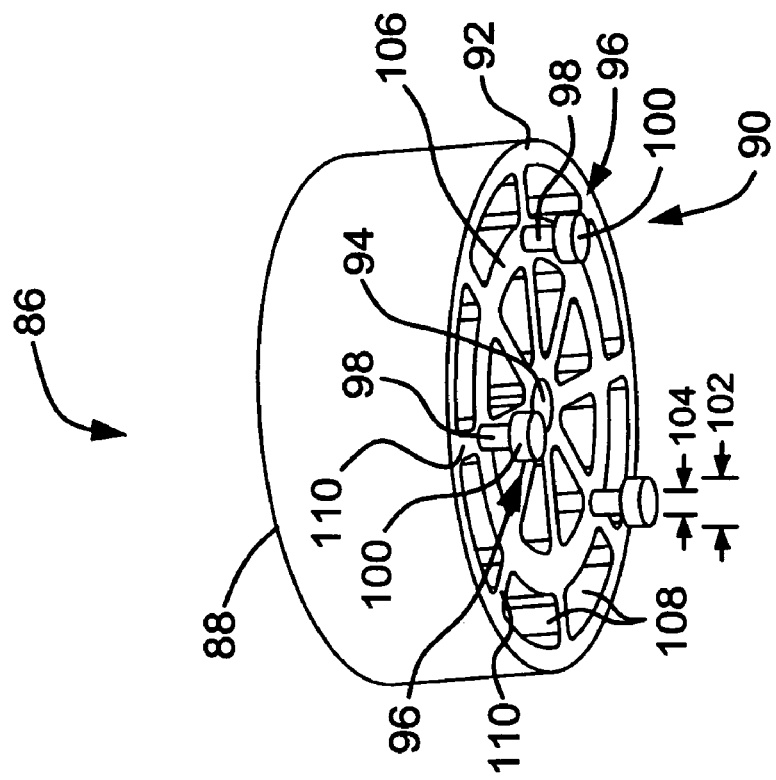
FIG. 6 is another bottom, perspective view of the spacer of FIG. 5.
Figure 5:
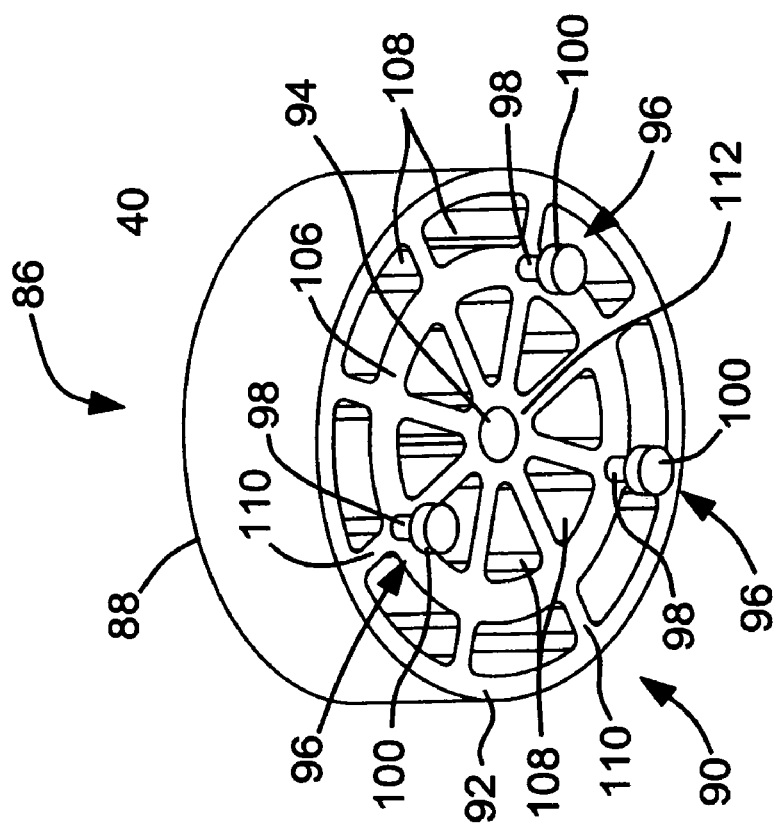
FIG. 5 is a bottom, perspective view of another spacer of the present invention.
Figure 7:
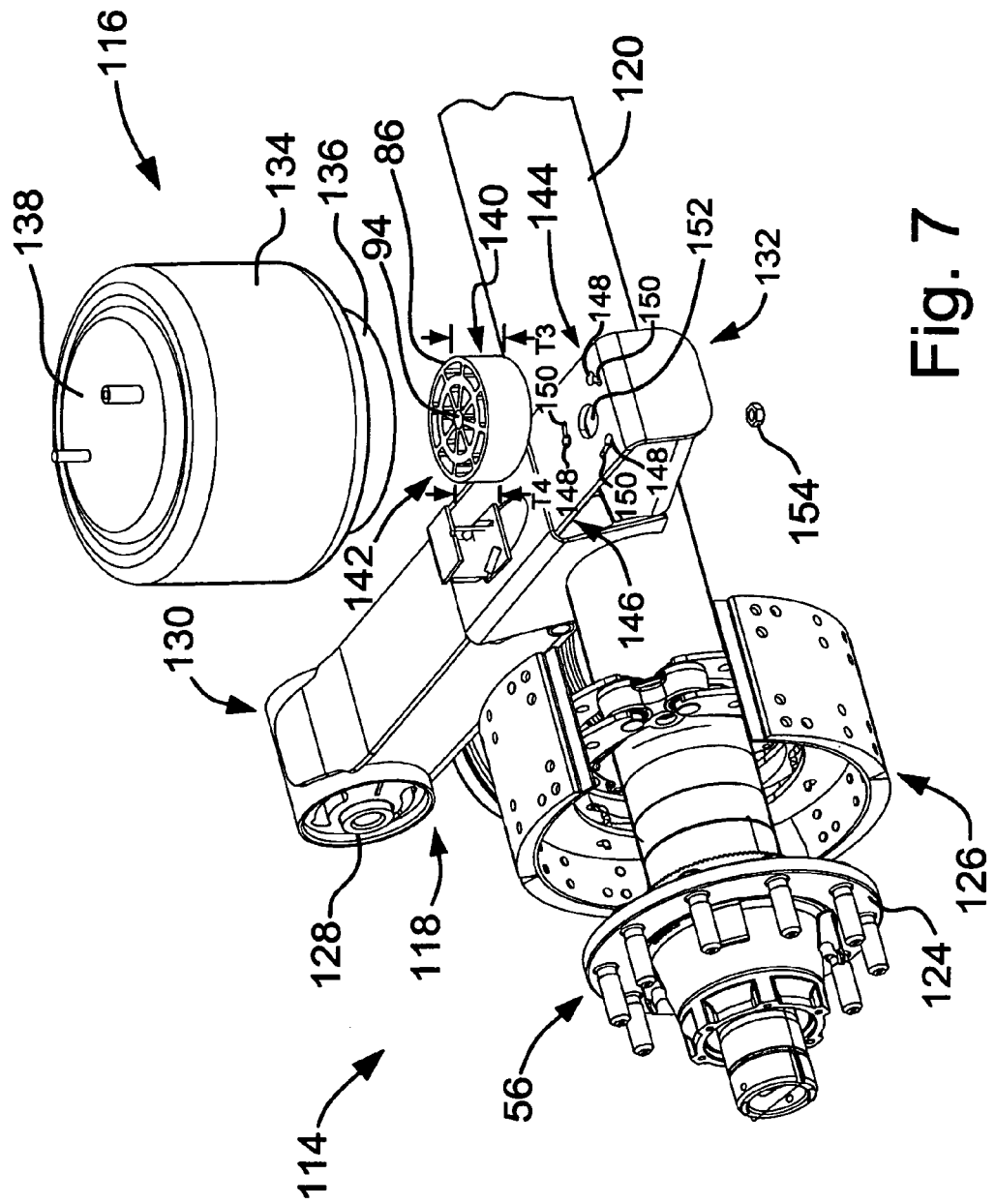
FIG. 7 depicts the spacer of FIGS. 5 and 6 as well as an air spring assembly, a trailing arm and a portion of an axle.

Referring now to FIGS. 5, 6 and 7, another embodiment of a spacer 86 of the present invention is depicted. The spacer 86 has an upper surface 88 and a lower surface 90. The upper surface 88 and the lower surface 90 are bounded by a curvilinear outer wall 92. Preferably, the outer wall 92 is substantially cylindrical, however, the present invention is not limited to cylindrical outer walls. The present invention functions equally well with outer walls that are of any shape.

The spacer 86 may be constructed or formed of one or more materials. For example, the spacer 86 may be a polymeric material, such as a plastic-type material, and/or it may be made of a metal material, such as iron or stainless steel.

The spacer 86 has a centrally located aperture 94. The centrally located aperture 94 extends from the upper surface 88 to the lower surface 90.

Depending from the lower surface 90 of the spacer 86 is a plurality of tabs 96. The tabs 96 may be integrally formed with the spacer 86 or they may be attached after the spacer 86 is formed. Thus, it can be appreciated that the tabs 96 can be formed of the same material as the spacer 86 or they can be of an entirely different material, such as metal.

Each of the tabs 96 has a body portion 98 and a head portion 100. The head portion 100 has a larger outer diameter 102 than an outer diameter 104 of the body portion 98. The head portions 100 are preferably located below the body portions 98.

The tabs 96 are all preferably located substantially equidistant from the centrally located aperture 94. As best seen in FIGS. 5 and 6, the tabs 96 depend downwardly from a middle web 106 located between the central aperture 94 and the outer wall 92 of the spacer 86. While the figures depict the tabs 96 depending from the middle web 106, it should be appreciated that they can depend from anywhere on the lower surface 90. Preferably, the tabs 96 are located substantially equidistant from one another except for at least one tab 96, for reasons that will be explained below.

The spacer 86 defines a second plurality of apertures 108 extending from the upper surface 88 to the lower surface 90. The second plurality 108 of apertures 108 preferably has a constant shape and size as they extend from the upper surface 88 to the lower surface 90. The individual apertures, even though they have a constant shape and size as they extend from the upper surface 88 to the lower surface 90, need not be identical to one another. Instead, the individual apertures, as compared to one another, may have very different shapes and sizes.

Preferably, the second plurality of apertures 108 are arranged so as to form webs and spokes in the spacer 86. In the depicted embodiment, there are a plurality of spokes 110 and an inner web 112, the middle web 106 mentioned above, and an outer web. The outer web is also the outer wall 92 of the spacer 86. The webs 92, 106, 112 preferably align with the webs of an air spring assembly base, described in more detail below. (See, for example, FIG. 10). The present invention, however, is not limited to the webs of the spacer and the webs of the air spring base being in alignment with one another. It should be appreciated that the present invention is not limited to any particular web or spoke design.

The spacer 86 depicted in FIGS. 5 and 6 is preferably installed on a vehicle suspension 114. One half of a representative vehicle suspension, on which the spacer 86 is installed, is depicted in FIG. 7. It can be appreciated that the other half of the vehicle suspension that is not depicted is substantially similar to the half depicted in FIG. 7.

The vehicle suspension 114 comprises an air spring assembly 116, a trailing arm 118, an axle tube 120 and a wheel end 122. The axle tube 120 supports a wheel end 122, which comprises a wheel flange 124. The wheel flange 124 is secured to a wheel hub (not shown) for mounting one or more wheels (not shown) thereon. A braking unit 126, such as that well known to those skilled in the art, is also depicted on the axle tube 120. It should be noted that while a trailer axle is depicted, the present invention is in no way limited to use on only trailer axles.

The trailing arm 118 is secured to the axle tube 120, such as by welding. The trailing arm 118 comprises a pivot bushing 128 at a forward portion 130 of the arm 118 for connection to a hanger bracket (not shown), as known by those skilled in the art. The trailing arm 118 also comprises a rearward portion 132.

The air spring assembly 116 comprises a bellows 134, a base 136 and an upper plate 138. The bellows 134 is located between the base 136 and the upper plate 138, as known by those skilled in the art. The base 136 preferably has a complimentary pattern of webs and spokes (not shown) to those of the spacer 86.

As seen in FIG. 7, the spacer 86 has a tapered design. Specifically, a rearward portion 140 of the spacer 86 has a thickness dimension T3 that is larger than a thickness dimension T4 of a forward portion 142 of the spacer 86. The tapered design of the spacer 86 can be accomplished by angling the upper surface 88 of the spacer 86 downwardly toward the lower surface 90, by angling the lower surface 90 of the spacer 86 upwardly toward the upper surface 88 or by angling the upper surface 88 and lower surface 90 toward each other.

Preferably, the spacer 86 is secured to the rearward portion 132 of the trailing arm 118 such that the forward portion 142 of the spacer 86 substantially faces the forward portion 130 of the trailing arm 118. This orientation of the spacer 86 causes the spacer 86 to present an upper surface 88 that is at an angle to the base 136 of the air spring assembly 116 due to the tapered nature of the spacer 86.

The spacer 86 is secured to the rearward portion 132 of the trailing arm 118 by engaging the tabs 96 with a plurality of slots 144 located in an upper plate 146 of the rearward portion 132 of the trailing arm 118. Each of the slots 144 has a wide end 148 that tapers to a narrow end 150. The wide ends 148 of the slots 144 receive the head portions 100 of each of the tabs 96. The head portions 100 of the tabs 96 extend below the upper plate 146. The spacer 86 is then rotated so that the narrow body portions 98 of the tabs 96 slide in the tapered slots 144 until they reach the narrow end 150 of each slot 144. The spacer 86 is now locked in place on the trailing arm 118.

Preferably, the slots 144 of the upper plate 146 are located in a complimentary orientation to the tabs 96 of the spacer 86. Having at least one tab 96 not located an equal distance from another tab 96 forces the spacer 86 to be installed on the trailing arm 118 in a particular orientation. Specifically, forward portion 142 of the spacer 86 is forced to be installed facing the forward portion 130 of the trailing arm 118 and the rearward portion 140 of the spacer 86 is forced to be installed facing the rearward portion 132 of the trailing arm 118.

A fastener (not shown) extends downwardly from the base 136 of the air spring assembly 116. This fastener extends through the centrally located aperture 94 of the spacer 86 and through an aperture 152 in the upper plate 138. A nut 154 is located on the fastener to secure the air spring assembly 116 onto the spacer 86 and the trailing arm 118. Preferably, the webs of the base 136 are aligned with the webs 92, 106, 112 of the spacer 86 so that compression forces from the vehicle are transmitted through the aligned webs. The present invention, however, is not limited to the webs of the base and the webs of the spacer being in alignment with one another.

The tapered nature of the spacer 86 results in the air spring assembly 116 resting on the spacer 86 at a predetermined angle. This angle assists in aligning various components of the suspension. The thickness of the spacer 86 also provides the proper spacing between the trailing arm 118 and the air spring assembly 116.

The tapered nature of the spacer 86 also causes the air spring assembly 116 to be located substantially perpendicular to the main frame members (not shown) of the vehicle, despite the fact that the upper plate 146 of the trailing arm 118 is not parallel with the main frame members. Orienting the air spring assembly 116 in a substantially perpendicular orientation is preferred because when the suspension 114, including the air spring assembly 116 is fully compressed, the base 136, or a resilient component attached to the base, contacts the upper plate 146 substantially at a right angle. Those skilled in the art know that if the base 136, or its resilient member, contact the upper plate 138 at an angle substantially other than approximately 90°, a side load is generated in the upper plate 138. Side loads can result in fatigue and potential failure of the air spring assembly 116 or potentially the vehicle structural members the air spring assembly 116 is attached to.

It is a discovery of the present invention that the spacer 86, located between the trailing arm 118 and the air spring assembly 116, primarily experiences compression forces. The spacer 86 experiences little or no shear forces. Thus, robust fastening devices or welding, as known from the prior art, is not required to maintain the spacer 86 in proper position during operation of the vehicle.

Figure 10:
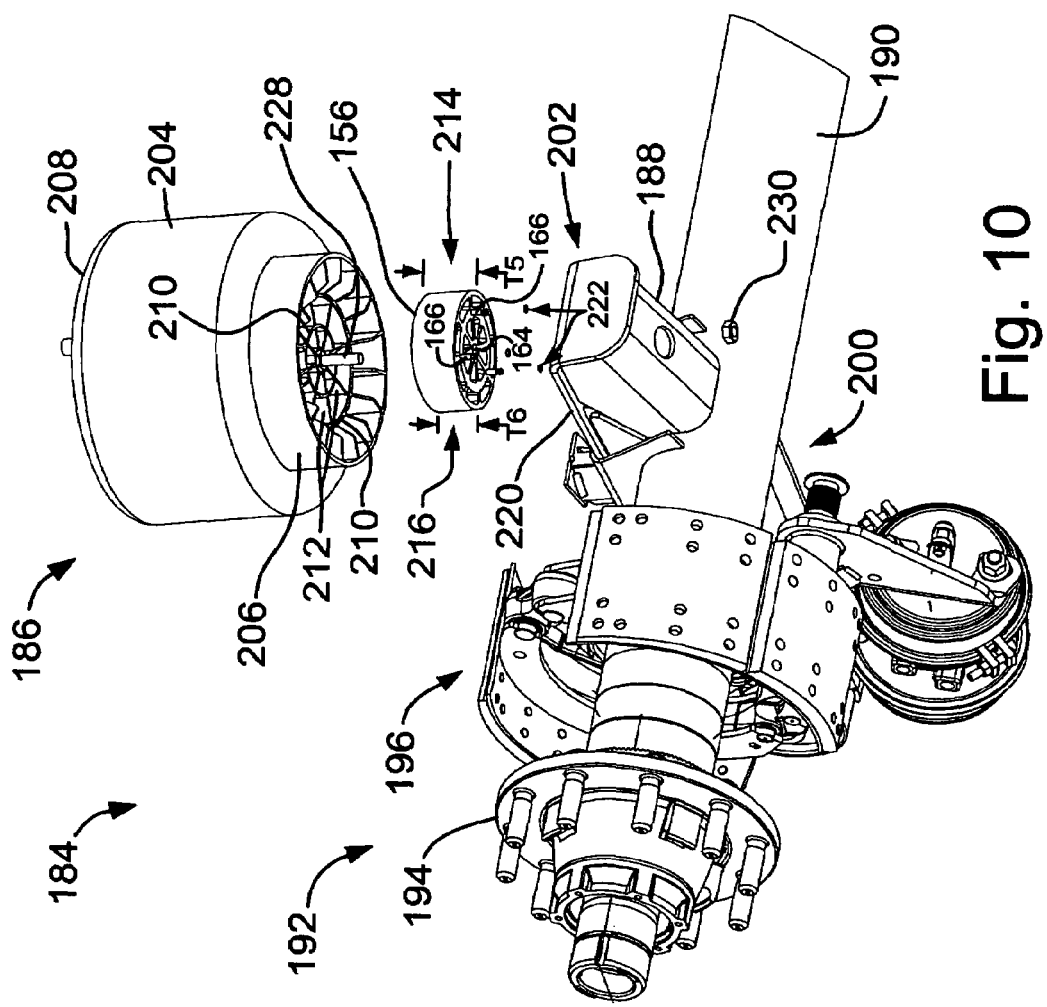
FIG. 10 depicts the spacer of FIGS. 8 and 9 as well as an air spring assembly, a trailing arm and a portion of an axle.
Figure 12:
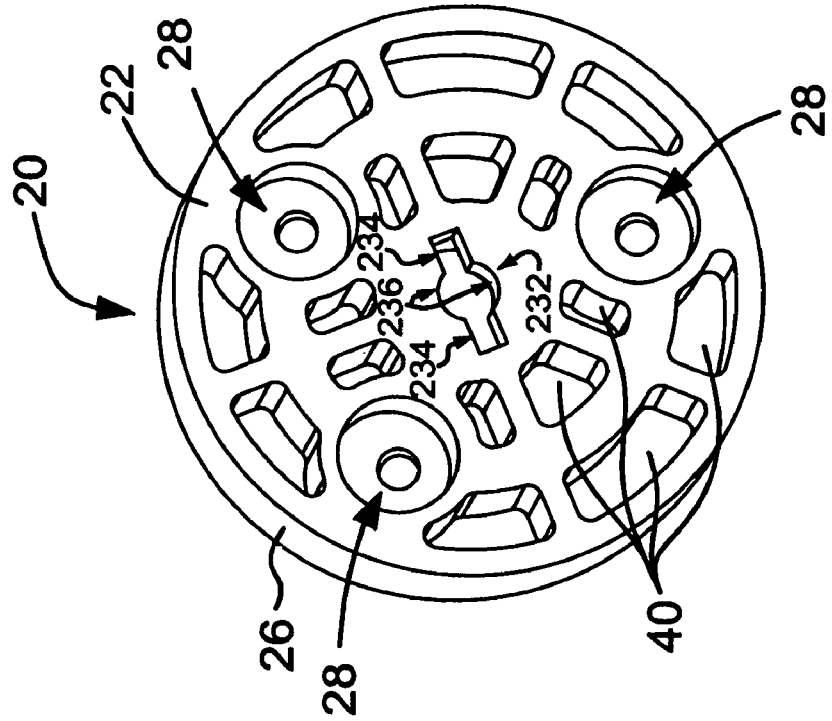
FIG. 12 is a top, perspective view of the spacer of FIG. 11.
Figure 11:
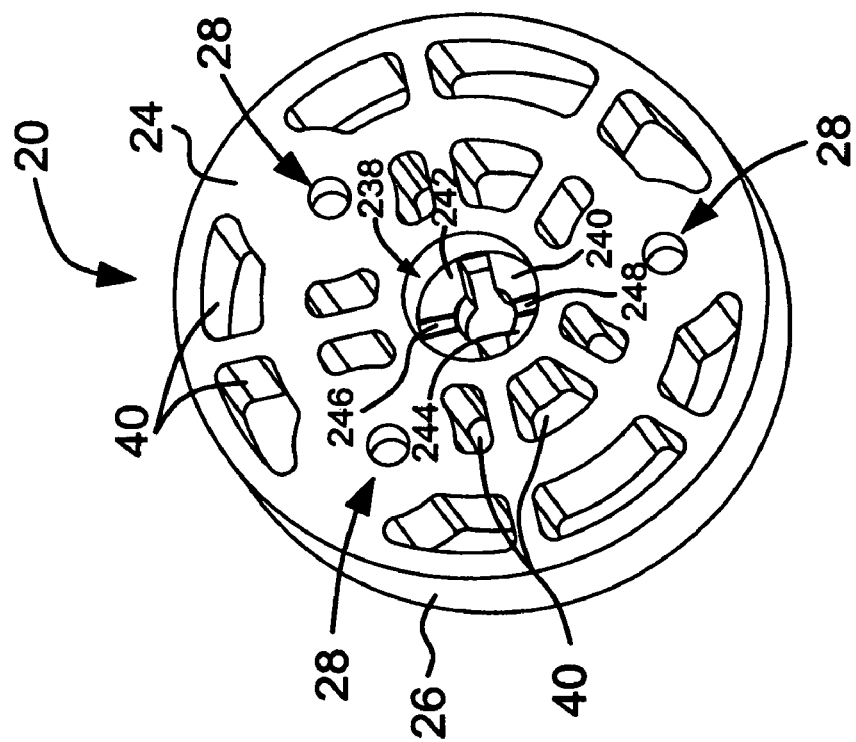
FIG. 11 is a bottom, perspective view of another spacer of the present invention.
Figure 13:
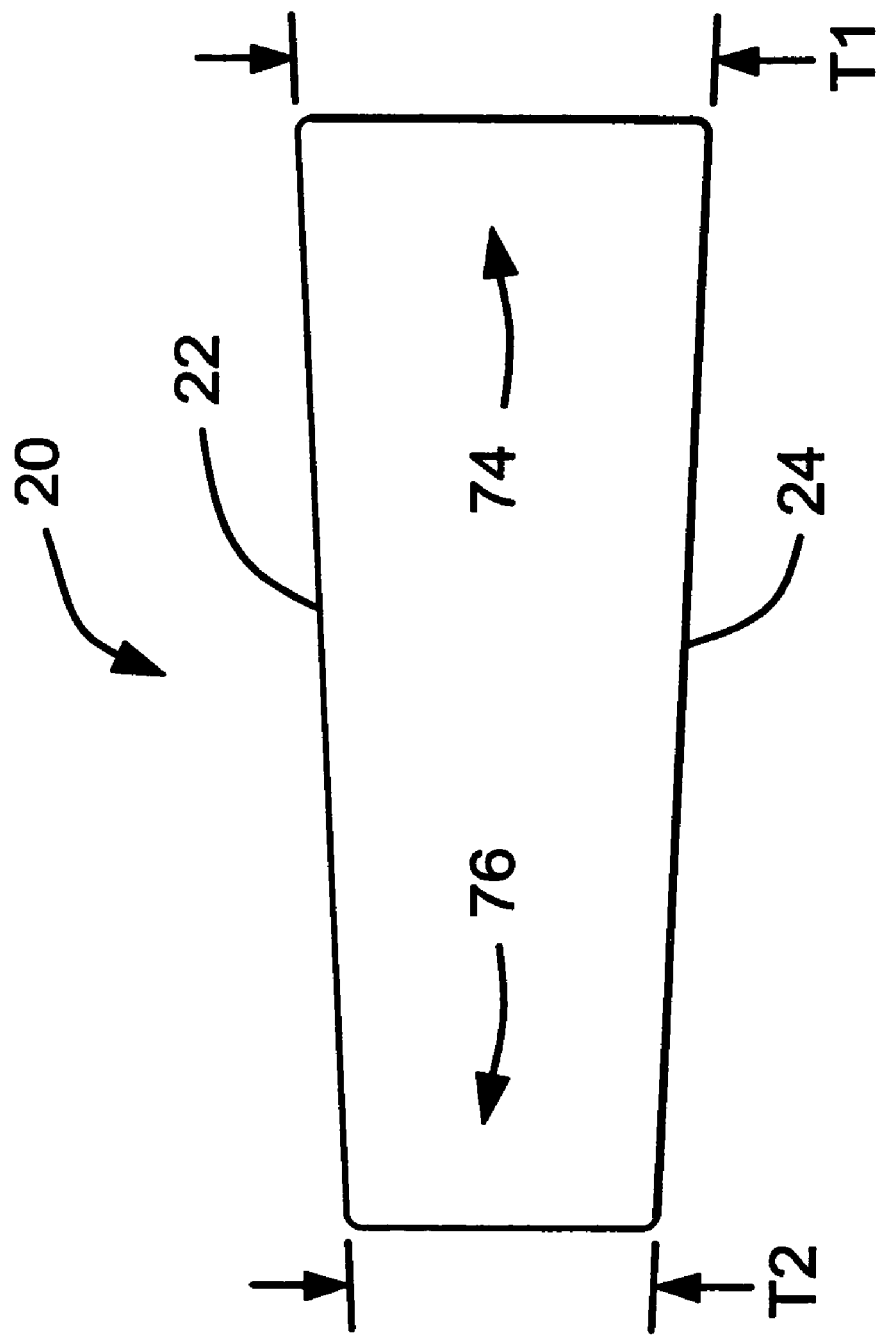
FIG. 13 is a side view of the spacer of FIGS. 11 and 12.
Figure 14:
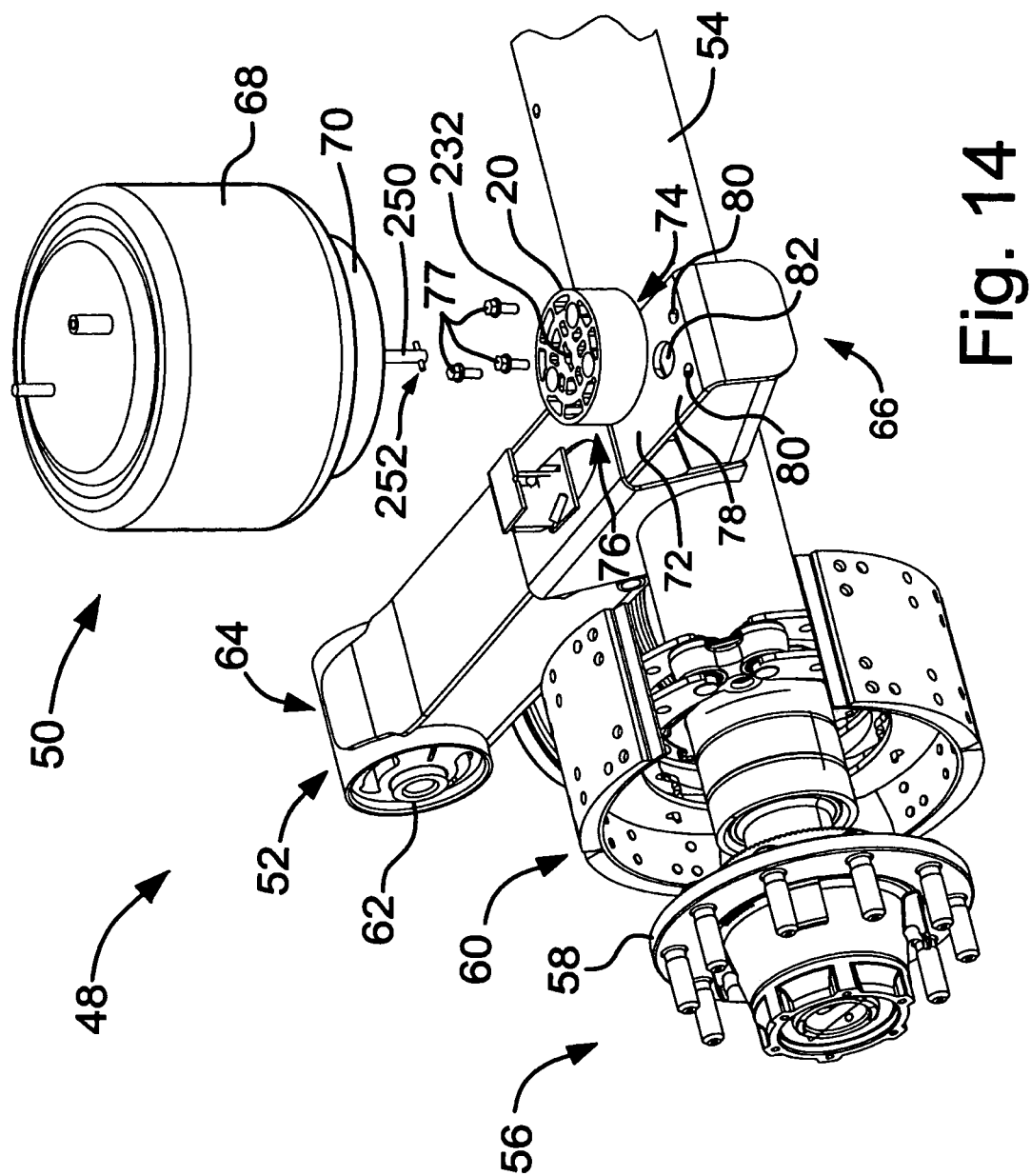
FIG. 14 depicts the spacer of FIGS. 11, 12 and 13 as well as an air spring assembly, a trailing arm and a portion of an axle.

Referring now to FIGS. 8, 9 and 10, another embodiment of a spacer 156 of the present invention is depicted. The spacer 156 has an upper surface 158 and a lower surface 160. The upper surface 158 and the lower surface 160 are bounded by a curvilinear outer wall 162. Preferably, the outer wall 162 is substantially cylindrical, however, the present invention is not limited to cylindrical outer walls. The present invention functions equally well with outer walls that are of any shape.

The spacer 156 may be constructed or formed of one or more materials. For example, the spacer 156 may be a polymeric material, such as a plastic-type material, and/or it may be made of a metal material, such as iron or stainless steel.

The spacer 156 has a centrally located aperture 164. The centrally located aperture 164 extends from the upper surface 158 to the lower surface 160.

Depending from the lower surface 160 of the spacer 156 is a plurality of dowels 166. The dowels 166 may be integrally formed with the spacer 156 or they may be attached after the spacer 156 is formed. Thus, it can be appreciated that the dowels 166 can be formed of the same material as the spacer 156 or they can be of an entirely different material, such as metal.

Each of the dowels 166 has a body portion 168 and a head portion 170. The head portion 170, with an associated lock device (described below), has a larger outer diameter 172 than an outer diameter 174 of the body portion 168. The head portion 170 is located below the body portion 168.

The dowels 166 are all preferably located substantially equidistant from the centrally located aperture 164. As best seen in FIGS. 8 and 9, the dowels 166 depend downwardly from a middle web 176 located between the central aperture 164 and the outer wall 162 of the spacer 156. While the figures depict the dowels 166 depending from the middle web 176, it should be appreciated that they can depend from anywhere on the lower surface 160. Preferably, the dowels 166 are located substantially equidistant from one another except for at least one dowel 166, for reasons that will be explained below.

The spacer 156 defines a plurality of apertures 178 extending from the upper surface 158 to the lower surface 160. The plurality of apertures 178 preferably has a constant shape and size as they extend from the upper surface 158 to the lower surface 160. The individual apertures, even though they have a constant shape and size as they extend from the upper surface 158 to the lower surface 160, need not be identical to one another. Instead, the individual apertures, as compared to one another, may have very different shapes and sizes. Preferably, the plurality of apertures 178 are arranged so as to form webs and spokes in the spacer 156. In the depicted embodiment, there are a plurality of spokes 180 and an inner web 182, the middle web 176 mentioned above, and an outer web. The outer web is also the outer wall 162 of the spacer 156. The webs 162, 178, 182 preferably align with the webs of an air spring assembly base, described in more detail below. (See, for example, FIG. 10). The present invention is not, however, limited to the webs aligning with one another. It should be appreciated that the present invention is not limited to any particular web or spoke design.

The spacer 156 depicted in FIGS. 8 and 9 is preferably installed on a vehicle suspension 184. One half of a representative vehicle suspension 184, on which the spacer 156 is installed, is depicted in FIG. 10. It can be appreciated that the other half of the vehicle suspension that is not depicted is substantially similar to the half depicted in FIG. 10.

The vehicle suspension 184 comprises an air spring assembly 186, a trailing arm 188, axle tube 190 and a wheel end 192. The axle tube 190 supports a wheel end 192, which comprises a wheel flange 194. The wheel flange 194 is secured to a wheel hub (not shown) for mounting one or more wheels (not shown) thereon. A braking unit 196, such as that well known to those skilled in the art, is also depicted on the axle tube 190. It should be noted that while a trailer axle is depicted, the present invention is in no way limited to use only on trailer axles.

The trailing arm 188 is secured to the axle tube 190, such as by welding. The trailing arm 188 comprises a pivot bushing (not shown) at a forward portion 200 of the arm 188 for connection to a hanger bracket (not shown), as known by those skilled in the art. The trailing arm 188 also comprises a rearward portion 202.

The air spring assembly 186 comprises a bellows 204, a base 206 and an upper plate 208. The bellows 204 is located between the base 206 and the upper plate 208, as known by those skilled in the art. The base 206 preferably has a complimentary pattern of webs 210 and spokes 212 to those of the spacer 156.

As seen in FIG. 9, the spacer 156 has a tapered design. Specifically, a rearward portion 214 of the spacer 156 has a thickness dimension T5 that is larger than a thickness dimension T6 of a forward portion 216 of the spacer 156. The tapered design of the spacer 156 can be accomplished by angling the upper surface 158 of the spacer 156 downwardly toward the lower surface 160, by angling the lower surface 160 of the spacer 156 upwardly toward the upper surface 158 or by angling the upper and lower surfaces 158, 160 toward each other.

Preferably, the spacer 156 is secured to the rearward portion 202 of the trailing arm 188 such that the forward portion 216 of the spacer 156 substantially faces the forward portion 200 of the trailing arm 188. This orientation of the spacer 156 causes the spacer 156 to present an upper surface 158 that is at an angle to the base 206 of the air spring assembly 186 due to the tapered nature of the spacer 156.

The spacer 156 is secured to the rearward portion 202 of the trailing arm 188 by engaging the dowels 166 with a plurality of apertures (not shown) located in an upper plate 220 of the rearward portion 202 of the trailing arm 188. The head portion 170 of each dowel 166 is fitted with a lock device 222, such as a snap ring or an O-ring. The lock device 222 has a slightly larger diameter 172 than a diameter (not shown) of one of the apertures (not shown). The lock device 222 is pushed through the aperture (not shown). The lock device 222 reduces the likelihood that the dowels 166 will back out of the apertures 218. The spacer 156 is now locked in place on the trailing arm 188.

Preferably, the apertures (not shown) of the upper plate 220 are located in a complimentary orientation to the dowels 166 of the spacer 156. Having at least one dowel 166 not located an equal distance from another dowel 166 forces the spacer to be installed on the trailing arm 188 in a particular orientation. Specifically, forward portion 216 of the spacer 156 is forced to be installed facing the forward portion 200 of the trailing arm 188 and the rearward portion 214 of the spacer 156 is forced to be installed facing the rearward portion 202 of the trailing arm 188.

As seen in FIG. 10, a fastener 228 extends downwardly from the base 206 of the air spring assembly 186. This fastener 228 extends through the centrally located aperture 164 of the spacer 156 and through an aperture (not shown) in the upper plate 220. A nut 230 is located on the fastener 228 to secure the air spring assembly 186 onto the spacer 156 and the trailing arm 188. Preferably, the webs 210 of the base 206 are aligned with the webs 162, 176, 182 of the spacer 156 so that compression forces from the vehicle are transmitted through the aligned webs 162, 176, 182, 210. The present invention is not limited, however, to the webs being aligned with one another.

The tapered nature of the spacer 156 results in the air spring assembly 186 resting on the spacer 156 at a predetermined angle. This angle assists in aligning various components of the suspension. The thickness of the spacer 156 also provides the proper spacing between the trailing arm 188 and the air spring assembly 186.

The tapered nature of the spacer 156 also causes the air spring assembly 186 to be located substantially perpendicular to the main frame members (not shown) of the vehicle, despite the fact that the upper plate 220 of the trailing arm 188 is not parallel with the main frame members. Orienting the air spring assembly 186 in a substantially perpendicular orientation is preferred because when the suspension 184, including the air spring assembly 186 is fully compressed, the base 206, or a resilient component attached to the base, contacts the upper plate 208 substantially at a right angle. Those skilled in the art know that if the base 206, or its resilient member, contact the upper plate 208 at an angle substantially other than approximately 90°, a side load is generated in the upper plate 208. Side loads can result in fatigue and potential failure of the air spring assembly 186 or potentially the vehicle structural members the air spring assembly 186 is attached to.

It is a discovery of the present invention that the spacer 156, located between the trailing arm 188 and the air spring assembly 186, primarily experiences compression forces. The spacer 156 experiences little or no shear forces. Thus, robust fastening devices or welding, as known from the prior art, is not required to maintain the spacer 156 in proper position during operation of the vehicle.

It can be appreciated that spacers 20, 86, 156 having any taper angle and having any thickness can be used. It can also be appreciated that the ease at which the spacers 20, 86, 156 can be installed, permits a vehicle owner to easily, quickly and inexpensively replace the spacers 20, 86, 156 to achieve various ride heights for the vehicle.

The present invention also comprises an apparatus for securing the air spring assemblies 50, 116, 186 to any of the spacers 20, 86, 156 described above. By way of example, the spacer 20 depicted in FIGS. 1-3, with a slight modification, will be used to describe the apparatus for securing the air spring assembly 50 to the spacer 20.

Referring now to FIGS. 11-14, a spacer 20 substantially as depicted in FIGS. 1-3 and described above is depicted. Hence, reference numbers used with FIGS. 1-3 are used again in FIGS. 11-14 for the same features.

The spacer 20 of FIGS. 11-14 differs from the spacer 20 depicted in FIGS. 1-3 in that the centrally located aperture 38 is not a hole but instead a slot 232 is provided. The slot has two end portions 234 that are joined together by two substantially similar semi-circles 236. As best seen in the bottom view of the spacer 20 in FIG. 11, the slot 232 extends to a chamber 238 in the spacer 20. The chamber 238 extends from the slot 232 to the lower surface of the spacer 20. The chamber 238 terminates in material 240 beneath the upper surface 22 that defines the slot 232. The material 240 defines a first and a second ramp 242, 244 as well as a first and a second groove 246, 248 adjacent the respective ramps 242, 244.

A bar 250, having two transversely extending arms 252, depends from the base 70 of the air spring assembly 50. The bar 250 and its arms 252 may be constructed of any material, including but not limited to, metal and/or a polymer, such as plastic. The bar 250 may be of any length or diameter, but it is preferred that it have a small enough diameter to fit within the slot 232 and have sufficient length so that it extends slightly beyond the slot 232 into the chamber 238. It is preferred that the arms 252 are just short enough to fit in the slot 232.

The spacer 20 is secured to the trailing arm 52 in the same or substantially the same manner as described above. Of course, if a spacer 86, 156 such as depicted in FIGS. 5-6 or FIGS. 8-9 is used, it is attached as described above. Before or after the spacer 20 is secured to the trailing arm 52, the bar and its arms are located through the slot. The bar 250 and its arms 252 are then rotated approximately 90 degrees so that the arms 252 engage the first and second ramps 242, 244. The arms 252 move along the ramps 242, 244 until they engage with the first and second grooves 246, 248. Engaged with the grooves 246, 248 the arms 252 thus prevent the air spring assembly 50 from disassociating with the spacer.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A vehicle suspension, comprising:
 a trailing arm having a forward portion and a rearward portion, said rearward portion having an upper, planar surface;
 an air spring assembly comprising a bellows located between a base and an upper plate; and
 a removable spacer having an upper surface and a lower surface where said lower surface rests on said upper planar surface of said trailing arm and said upper surface contacts said base of said air spring assembly, said spacer being tapered from said rearward portion of said trailing arm toward said forward portion of said trailing arm to locate said air spring assembly.

2. The vehicle suspension of claim 1, wherein said upper surface of said spacer is angled.

3. The vehicle suspension of claim 1, wherein said lower surface of said spacer is angled.

4. The vehicle suspension of claim 1, wherein said upper and said lower surfaces of said spacer are angled toward one another.

5. The vehicle suspension of claim 1, wherein mechanical fasteners are used to secure said spacer to said upper, planar surface of said trailing arm, said mechanical fasteners extending through apertures in said spacer to apertures in said trailing arm, wherein not all apertures in said spacer are equidistant from one another and said apertures in said trailing arm have a complimentary arrangement so that said spacer is secured to said trailing arm.

6. The vehicle suspension of claim 1, wherein a plurality of structures, depending from said lower surface of said spacer, engage with a plurality of apertures in said upper, planar surface of said trailing arm to secure said spacer to said trailing arm, wherein not all of said plurality of structures are equidistant from one another and said apertures in said trailing arm have a complimentary design so that said spacer is secured to said trailing arm.

7. A spacer for a vehicle suspension, comprising:
an upper surface;
a lower surface;
a centrally located aperture extending from said upper surface to said lower surface; and
a first plurality of fastener apertures all equidistant from said centrally located aperture, wherein the individual apertures of said first plurality of apertures are located equidistant from one another except for one aperture that is not;
wherein at least one of said surfaces is angled toward the other.

8. The spacer of claim 7, wherein said first plurality of fastener apertures each extends from said upper surface to said lower surface and each of said first plurality of fastener apertures has an upper increased diameter portion and a smaller diameter portion beneath said upper increased diameter portion.

9. The spacer of claim 7, wherein fasteners are located though said fastener apertures and through apertures in a trailing arm upon which said spacer rests to removably secure said spacer to said trailing arm, wherein said apertures in said trailing arm are arranged in a same pattern as said fastener apertures so that a thinner portion of said spacer faces a forward portion of said trailing arm.

10. The spacer of claim 7, wherein said first plurality of fastener apertures is located among a second plurality of apertures in said spacer.

11. A spacer for a vehicle suspension, comprising:
an upper surface;
a lower surface;
a centrally located aperture extending from said upper surface to said lower surface; and
a plurality of tabs, all equidistant from said centrally located aperture and each having a head portion and a body portion, extending from said lower surface, wherein the individual tabs of said plurality of tabs are located equidistant from one another except for one tab that is not;
wherein at least one of said surfaces is angled toward the other.

12. The spacer of claim 11, wherein said head portion of each of said plurality of tabs has a greater diameter than said body portion.

13. The spacer of claim 11, wherein said plurality of tabs is located on a web located between said central aperture and an outer wall of said spacer.

14. The spacer of claim 11, wherein said plurality of tabs engage with a plurality of slots on an upper, rear portion of a trailing arm, said slots being wider at one of their ends than at the other of their ends, to removably secure said spacer with said trailing arm.

15. The spacer of claim 14, wherein said slots are arranged such that only one of said slots will receive said one tab that is not equidistant from the other tabs so that a thinner portion of said spacer faces a forward portion of said trailing arm.

16. A spacer for a vehicle suspension, comprising:
an upper surface;
a lower surface;
a centrally located aperture extending from said upper surface to said lower surface; and
a plurality of dowels, all equidistant from said centrally located aperture and each having a head portion and a body portion, extending from said lower surface, wherein the individual dowels of said plurality of dowels are located equidistant from one another except for one dowel that is not;
wherein at least one of said surfaces is angled toward the other.

17. The spacer of claim 16, wherein said head portion comprises a locking device.

18. The spacer of claim 17, wherein said locking device has a greater diameter than said body portion.

19. The spacer of claim 16, wherein said plurality of dowels is located on a web located between said central aperture and an outer wall of said spacer.

20. The spacer of claim 16, wherein said plurality of dowels engage with apertures on an upper, rear portion of a trailing arm to removably secure said spacer to said trailing arm and wherein said plurality of dowels engage said apertures such that a thinner portion of said spacer faces a forward portion of said trailing arm.

21. A spacer for a vehicle suspension, comprising:
an upper surface;
a lower surface; and
a centrally located slot in said upper surface, said slot being in communication with a chamber in said spacer, said chamber having an upper portion with at least one ramp and at least one groove;
wherein at least one of said surfaces is angled toward the other.

22. The spacer of claim 21, wherein said slot receives a bar from an air spring assembly, said bar comprising at least one transverse member, wherein said transverse member engages said at least one ramp and said at least one groove to removably secure said air spring assembly to said spacer.

* * * * *